United States Patent

Graf et al.

[19]

[11] Patent Number: 6,028,960
[45] Date of Patent: Feb. 22, 2000

[54] FACE FEATURE ANALYSIS FOR AUTOMATIC LIPREADING AND CHARACTER ANIMATION

[75] Inventors: Hans Peter Graf, Lincroft; Eric David Petajan, Watchung, both of N.J.

[73] Assignee: Lucent Technologies Inc., Murray Hill, N.J.

[21] Appl. No.: 08/716,959

[22] Filed: Sep. 20, 1996

[51] Int. Cl.[7] .................................................. G06K 9/46
[52] U.S. Cl. ........................ 382/203; 382/100; 382/118; 382/165
[58] Field of Search .................................. 382/100, 103, 382/114, 118, 165, 172, 174, 203, 209, 253, 270

[56] References Cited

U.S. PATENT DOCUMENTS

| | | | |
|---|---|---|---|
| 4,975,960 | 12/1990 | Petajan | 381/43 |
| 5,761,329 | 6/1998 | Chen et al. | 382/118 |

OTHER PUBLICATIONS

Automatic Lipreading to Enhance Speech Recognition, Eric David Petajan, Urbana, Illinois 1984.
Automated Lip–Sync: Direct Translation of Speech–Sound to Mouth–Shape, Barrett E. Koster, Robert D. Rodman and Donald Bitzer—Nato Workshop—Sep. 5, 1995.
Using Deformable Templates to Infer Visual Speech Dynamics, Marcus E. Hennecke, K Venkatesh Prassad, David G. Stark, Asilomar Workshop—Oct. 31, 1994.
Lip Modeling for Visual Speech Recognition, Ram R. Rao and Russell M. Mersereau, Alisomar Workshop—Oct. 31, 1994.
Sensory Integration in Audiovisual Automatic Speech Recognition, Peter L. Silsbee, Asilomar Workshop—Oct. 13, 1994.
Locating Faces and Facial Parts, Hans Peter Graf, Tsuhan Chen, Eric Petajan, Eric Cosatto, Proceedings of the International Workshop on Automatic Face–and Gesture–Recognition, Bichsel (ed), Multimedia Laboratory, U. Zurich, 1995, pp. 41–46—Jun. 26, 1995.
Experiments with an articulatory Speech Recognizer, Igor Zlokarnik, Eurospeech 93, Berlin, Sep. 1993.

*Primary Examiner*—Phuoc Tran

[57] ABSTRACT

A face feature analysis which begins by generating multiple face feature candidates, e.g., eyes and nose positions, using an isolated frame face analysis. Then, a nostril tracking window is defined around a nose candidate and tests are applied to the pixels therein based on percentages of skin color area pixels and nostril area pixels to determine whether the nose candidate represents an actual nose. Once actual nostrils are identified, size, separation and contiguity of the actual nostrils is determined by projecting the nostril pixels within the nostril tracking window. A mouth window is defined around the mouth region and mouth detail analysis is then applied to the pixels within the mouth window to identify inner mouth and teeth pixels and therefrom generate an inner mouth contour. The nostril position and inner mouth contour are used to generate a synthetic model head. A direct comparison is made between the inner mouth contour generated and that of a synthetic model head and the synthetic model head is adjusted accordingly. Vector quantization algorithms may be used to develop a codebook of face model parameters to improve processing efficiency. The face feature analysis is suitable regardless of noise, illumination variations, head tilt, scale variations and nostril shape.

17 Claims, 4 Drawing Sheets

FACE FEATURE ANALYSIS FOR AUTOMATIC LIPREADING AND CHARACTER ANIMATION

BACKGROUND OF THE INVENTION

1. Field of the Invention

The present invention is directed to the acquisition of facial features, in particular for visual speech processing.

2. Description of the Related Art

Human speech is discerned by acoustic processing. In addition, while acoustically processing speech the listener is simultaneously observing relevant visual information from the speaker's mouth and lips and performing complementary visual speech processing by speechreading or lipreading. Traditionally, acoustic speech recognition (ASR) systems have ignored, the visual component and concentrated exclusively on the acoustic component of speech. Because the visual component was ignored conventional ASR systems tended to perform poorly in less than ideal environments with high acoustic noise or multiple speakers. In addition, acoustic system performance is highly dependent on the particular microphone type and its placement; however, people typically find head-mounted microphones uncomfortable during extended use and impractical in many situations.

Recently, ASR system research has begun to focus on the advantages of incorporating visual speech processing technology to provide visual information for improving concentrated on developing an efficient method for extracting visual parameters, most notably the size and shape of the lips. Real-time processing of a full image to reliably identify facial features is difficult. Consequently, heretofore methods of identifying visual speech information have incorporated artificial means of tracking a particular facial feature, e.g. lip markers or patterned illumination, to readily recognize and track only the lips. These methods fail to provide practical applications without facial parameters and fixed lighting or requiring that the subject wear markers on the face.

By far the easiest feature of a face to identify and track accurately is the nostrils. The nostrils may be readily identified because they are located in the middle of the face, they are darker than the darkest skin color and they are rarely obscured by facial hair. Previous systems have recognized and used nostril tracking as an efficient and accurate means for locating and tracking the lips, such as the electronic facial tracking and detection system and method and apparatus for automated speech recognition disclosed in U.S. Pat. No. 4,975,960. This patented system is based upon the process of defining a first window around the nostrils and a second window around the mouth region in relation to the first window. Mouth movements during speech are tracked and matched to templates stored in memory. A significant disadvantage associated with this tracking and detection system is that it requires specific lighting arrangements, as, for example, shown in FIG. 7 of the patent, and thus has limited practical application. Moreover, the tracking and detection system described in that U.S. Pat. No. 4,975,960 uses non-adaptive thresholding, thereby rendering the system is sensitive to lighting variations.

Thus, it is desirable to develop a method for extracting visual information for practical applications suitable for use in a variety of viewing conditions, such as varied lighting conditions, head motion and variations between speakers, while incorporating the computational efficiency of nostril tracking.

SUMMARY OF THE INVENTION

The face feature analysis in accordance with the present invention tracks the speaker's nostrils from frame to frame regardless of noise, illumination variations, moderate head tilt in the image plane, scale variations and nostril shape. In addition, the face feature analysis system is suitable for use with typical facial parameters (e.g. glasses, facial hair, skin color) associated with individual speakers.

Multiple face feature candidates, e.g. eyes and nose positions, are generated using an isolated frame face analysis. Then, a nostril tracking window is defined around a nose candidate and tests are applied to pixels therein based on percentages of skin color area pixels and nostril area pixels to determine whether the nose candidate represents an actual nose. Once actual nostrils are identified, the size, separation and contiguity of the actual nostrils are determined by projecting the nostril pixels within the nostril tracking window.

A mouth window is defined around a mouth region relative to the position of the nostril tracking window. Mouth detail analysis is then applied to the pixels within the mouth window to identify inner mouth and teeth pixels and to generate therefrom an inner mouth contour. This visual information is mapped to a synthetic talking head model which is scaled and rotated. In addition, vector quantization algorithms may be used to develop a codebook of face model parameters so as to improve processing efficiency.

The face feature analysis system in accordance with the present invention has numerous applications. Small color video cameras are inexpensive and can thus be readily positioned for capturing facial images. In particular, a camera placed just below a computer monitor can capture facial features (including nostrils) throughout all normal head motions, e.g. looking down at the keyboard and slouching. In addition to personal computer environments, other ideal applications include, but are not limited to, bank machines, cars, kiosks, point of sale terminals (cash registers), laptop or notebook computers, copying machines, access control stations, aircraft cockpits and personal digital assistants.

Moreover, because only a few facial parameters are required to generate a synthetic model talking head, the parameters can be encoded into a very low bit rate signal for transmission over ordinary phone lines using either voice/data modems or data modems with digital audio compression. The applications for this low bit rate transmission application include video conferencing, model-based coding (MPEG-4), network interactive games, televideo marketing, enhanced public address systems in noisy environments, entertainment, speech recognition and enhanced computer/human interaction. If the system is simultaneously used for video coding and speech recognition, then the cost of implementation is still more economical. Since the facial features are readily transmitted using the telephone network, acoustic/visual speech recognition in the network is feasible.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PRESENTLY PREFERRED EMBODIMENTS

Figure 4:
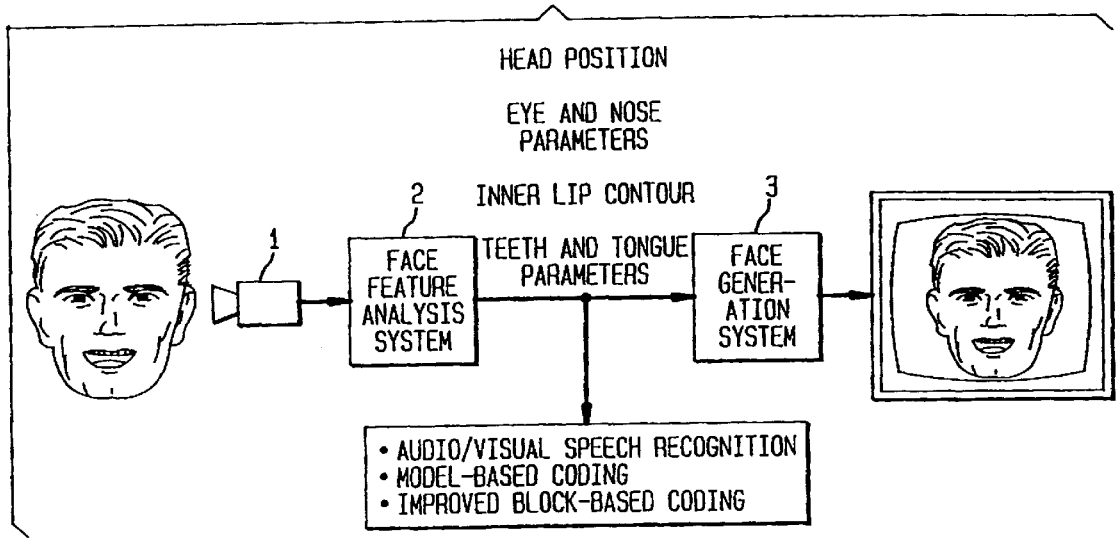
FIG. 4 diagrammatically depicts applications for the face feature analysis system in accordance with the present invention.

Referring initially to FIG. 4, a video camera 1 is suitably positioned in front, and slightly below center view, of a face to maintain continuous viewing of the nostrils under normal or typical circumstances (moderate head movement). The recorded image is then transmitted to a face feature analysis system 2. Face feature analysis system 2 tracks facial parameters and transmits the parameters to a face generation system 3 which generates a synthetic model face in accordance with the parameters.

Figure 1:
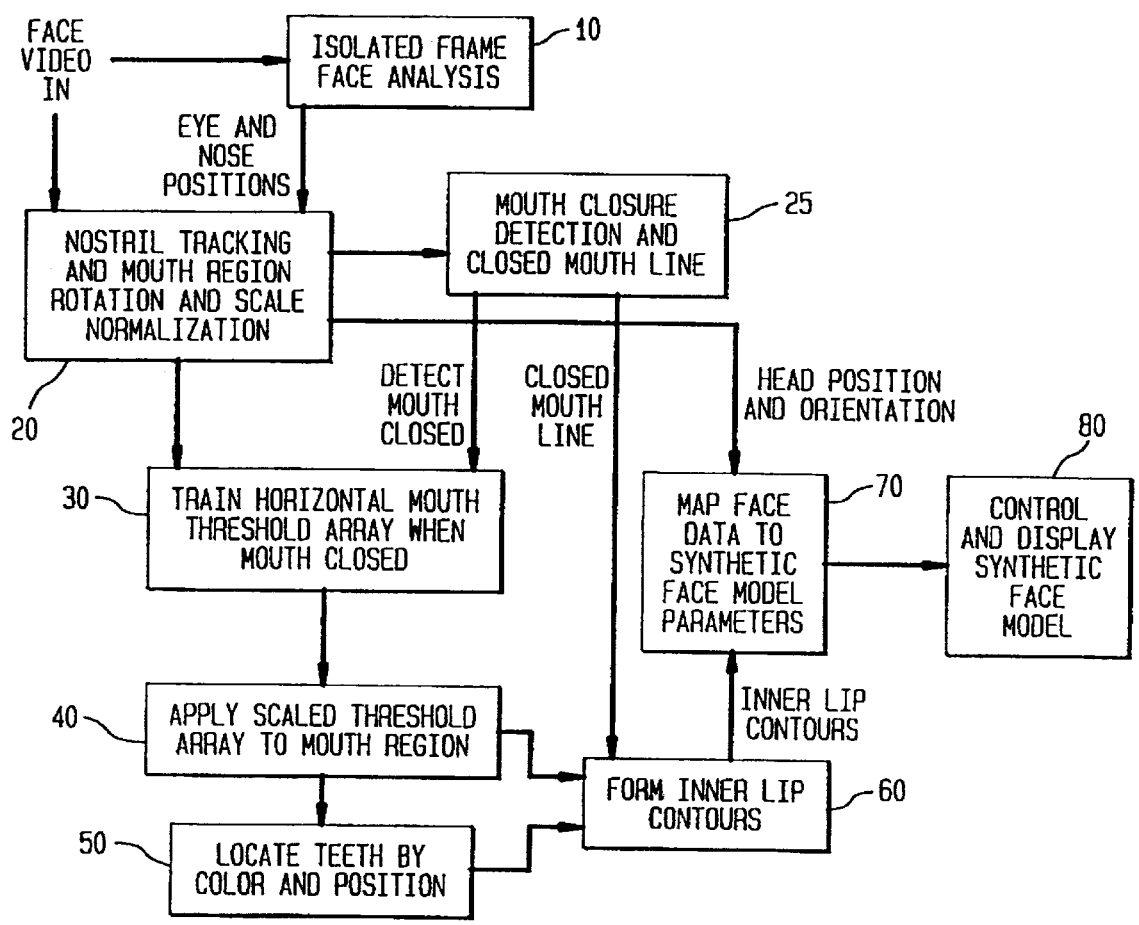
FIG. 1 is a block diagram of a face feature analysis system in accordance with the present invention.

FIG. 1 is a block diagram of the steps comprising a preferred embodiment of a the face feature analysis system in accordance with the present invention. The process begins in block 10 by performing an isolated frame face analysis to locate the position of a face by searching the full image frame for possible facial features. In a preferred embodiment, the isolated frame face analysis of block 10 is performed by a face recognition algorithm which uses morphological filtering to provide multiple facial feature candidates, e.g. possible eye, nose and mouth blobs as, for example, described in U.S. patent application Ser. No. 08/494,900, filed on Jun. 26, 1995, entitled "Locating Features in an Image", which is incorporated herein by reference. Despite the advantage of being suitable in a natural environment, i.e. without strict constraints on the position of the camera or the lighting conditions, this full frame feature analysis is slow and generates lower resolution facial parameters. Therefore, the full frame analysis is merely used as a starting point to identify that which appears to be a face by locating the position of blobs or structures possibly representing the eyes, nose and mouth of a face. In accordance with the present invention any other face recognition algorithm may alternatively be used, provided that it generates multiple facial feature candidates, e.g. eyes, nose and mouth positions. Once the positions of the eye, nose and mouth are estimated, the size of the face is determined from the eyes and eye-nose-mouth distances based on anatomical characteristics.

Nostril Tracking Method

After locating multiple facial feature candidates within a frame, a more precise analysis is performed on a limited portion of the frame to determine which, if any, of the nose blob candidates represent actual nostrils of a face. It is advantageous to perform this further processing on only a portion of the frame, in lieu of using the isolated frame face analysis processing of block 10 over a full frame, for real-time processing. This further analysis focuses on identifying and tracking the nostrils. The nostrils may be readily and accurately identified and tracked since they are merely two holes in the middle of the face which are darker than the darkest skin and are rarely obscured.

Nostril identification and tracking is performed in nostril tracking and mouth region rotation and scale normalization block 20. Tracking of the nostrils begins by defining a nostril tracking window (NTW) surrounding one of the nose blob candidates recognized by the isolated frame face analysis of block 10. The NTW is defined so that it is small enough not to include the eyes or mouth yet large enough to contain the nostrils in the next frame after the fastest possible head movement.

The pixels within the NTW are analyzed by performing skin color area and nostril area tests to determine whether the nose blob candidate represents actual nostrils. First, the pixels within the NTW are tested to determine whether the number of pixels which are representative of a skin color area indicates that the nostrils have been properly recognize. That is, the intensity of each pixel within the NTW is tested to see if it falls within a range of predetermined skin colors developed a priori based on typical flesh tone colors. Preferably, the predetermined skin colors are stored, for example, in a look-up table, and only the most significant 6 bits of the RGB values are used as table indices in order to reduce processing overhead; however, the optional use of a higher number of significant bits is also contemplated. In addition, YUV values may alternatively be used instead of RGB values. If the pixel intensity lies within an acceptable range of predetermined skin color values, then the pixel is classified as a skin color area pixel. Then the percentage of pixels classified as skin color area is tested to see if it falls within an acceptable skin color area percentage range. The preferred acceptable skin color area percentage range is 3% to 100%; however, other ranges are also contemplated. If the percentage of classified skin color area pixels does not fall within the acceptable skin color area percentage range, then the nose candidate about which the NTW is positioned does not represent actual nostrils and another nose blob candidate is retrieved from block 10 and tested.

If the percentage of classified skin color area pixels does, on the other hand, fall within the acceptable skin color area percentage range, a nostril area test is performed on the pixels within the NTW to further ensure that the nose candidate represents actual nostrils. An RGB color nostril threshold value, represented by an 8-bit intensity value, is set within a color nostril threshold value range and each pixel within the NTW is binarized based on the color nostril threshold value. The color nostril threshold value range is defined by setting maximum and minimum value RGB components. From testing it has been determined that nostril color threshold ranges defined by minimum RGB component values (40, 10, 10) and maximum RGB component values (160, 130, 130) produce sufficiently accurate results with limited processing; however, the full color range (0 through 255) or any combination thereof may also be used. In an alternative embodiment, YUV thresholds may be used in which the U and V threshold components are set to a fixed range and the luminance Y threshold component is adjusted. Preferably, the color nostril threshold is initially set to the minimum color nostril threshold value since, typically, dark blobs representative of a nostril are closer to the minimum values; however, any color nostril threshold value between 0 and 255 may be used as the initial value. Dark pixels, with an intensity less than the color nostril threshold, are classified as nostril area pixels, whereas light pixels with an intensity greater than the color nostril threshold are representative of skin color area pixels. A percentage area of nostril area pixels is compared to a predetermined nostril area percentage range. Preferably, the acceptable nostril area percentage range is 1% to 13%, although, other range values may be used. If the percentage of nostril area pixels does not fall within the acceptable nostril area percentage range, then each of the RGB components of the color nostril threshold value is suitably incremented or decremented by one and the nostril area test repeated using the adjusted color nostril threshold value. In a modification, the color nostril threshold value may be incremented or decremented by a value other than one, thereby improving processing efficiency at the expense of reduced accuracy. This process of adjusting the color nostril threshold value and testing the pixels within the NTW is repeated until the percentage of nostril area pixels falls within the acceptable nostril area percentage range (the color nostril threshold value represents a final selected nostril threshold value), thus indicating that actual nostrils have been recognized. If after processing all of the color nostril threshold values within the nostril color threshold value range actual nostrils have not been recognized, then another nostril blob candidate is retrieved from the isolated frame face analysis of block 10 and the skin color area and nostril area tests are repeated using this new set of pixels.

Figure 2:
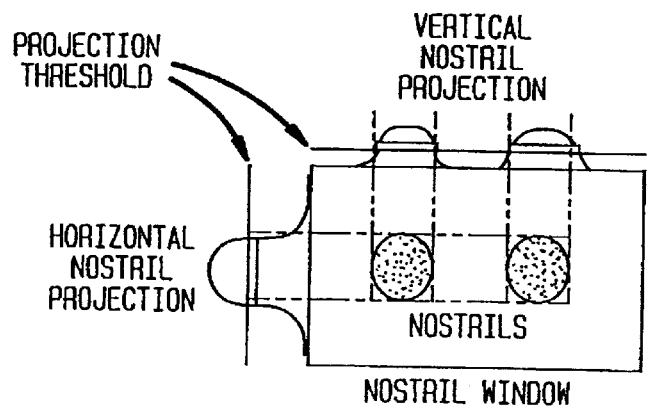
FIG. 2 diagrammatically depicts horizontal and vertical projections of nostril pixels included as part of nostril tracking analysis in accordance with the invention.
Figure 3:
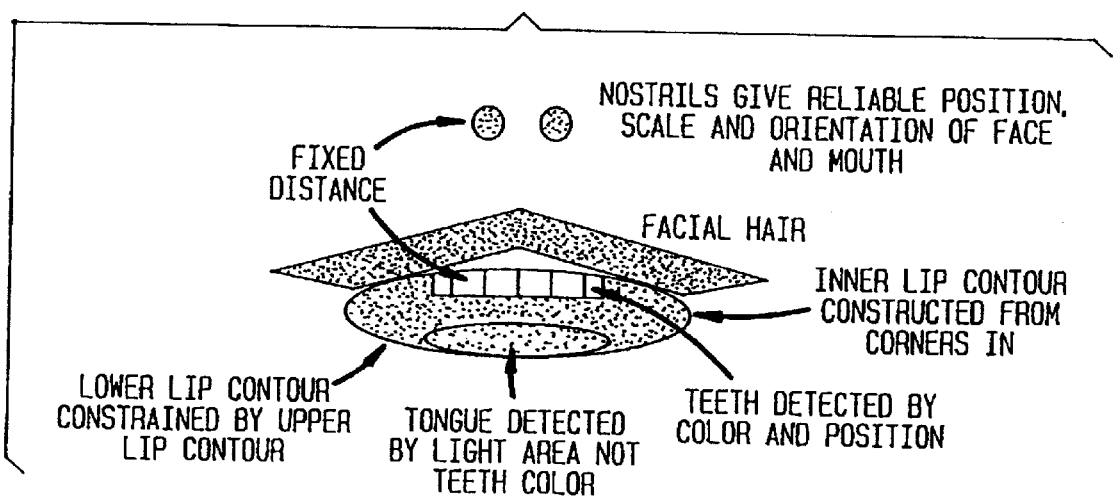
FIG. 3 diagrammatically depicts a mouth analysis and tracking method of the face feature analysis system in accordance with the invention.

Once the actual nostrils are recognized (i.e. both skin color area and nostril area tests produce results which fall within acceptable ranges), nostril size, separation and contiguity tests are performed using projections or histograms of the nostril pixels within the NTW. Referring to FIG. 2, horizontal and vertical projection thresholds are set and the nostril pixels are projected in each direction, resulting in the depicted projection curves, using known projection techniques. A pair of nostril size values (position, height, width and separation distance) is determined by projecting the pixels of each nostril and computing the run length of projection values which exceed the vertical and horizontal projection thresholds. The width of each nostril and separation between nostrils are determined from the vertical nostril projection thresholds. In addition, the height of the nostrils is determined from the horizontal nostril projection thresholds.

An advantage of using projection threshold techniques for tracking the nostrils in accordance with the present invention is that the system is capable of tracking nostrils even when the subject's head is slightly tilted in the image plane. In general, because the NTW has not yet been adjusted to accommodate for head tilt of the subject, projecting the nostrils will yield one or two vertical and horizontal projection runs (bumps), depending upon the degree of uncompensated head tilt. If the subject's head is not rotated at all or is rotated only slightly in the image plane, then the horizontal nostril projection will generate a single bump and two bumps will be generated by the vertical nostril projection, as shown in FIG. 2. Moreover, the nostril tracking system in accordance with the invention is capable of properly tracking the nostrils even when the subject's head is significantly tilted in the image plane. Thus, where a large degree of uncompensated head tilt exists (so that the nostrils are oriented substantially along a diagonal relative to the NTW), projecting the nostril pixels will result in two bumps in both the horizontal and vertical projections. In this special case, determining the position of the actual nostril requires further analysis. The position of the actual nostrils is then determined by drawing a horizontal line bisecting each bump in the horizontal nostril projection and a vertical line bisecting each bump in the vertical nostril projection. The horizontal and vertical lines intersect one another in four places representing all possible nostril positions, of which two intersections along a diagonal represent the actual nostril positions. In order to determine which two of the four intersections represent actual nostril positions, the pixels in the region surrounding each intersection are tested for dark pixels (nostril pixels). Once one of the actual nostrils has been identified at one of the four intersections, the other nostril is verified as being positioned at the intersection along the diagonal therefrom.

Nostril size values are determined from the projection curves generated for each vertical and horizontal projection threshold in a range of possible projection threshold values. Projection threshold values range from a maximum value at the peak of the projection curve to a selected minimum value or zero. Nostril size values generated for each projection threshold within the range of projection threshold values are compared with the template values in a set of possible scaled template values. The template which best matches (as measured by the absolute value difference in distance) the nostril size values based on a particular projection threshold is selected to represent the nostrils in the synthetic model image. This best match analysis is determined by scoring each template based on the sum of the difference between the projection nostril size values and template nostril size values. However, each of the nostril size values are not of equal importance or significance—e.g. separation is the most significant—in properly tracking the nostrils and, thus, the nostril size values are accordingly weighted prior to calculating the sum defined by the equation:

score=(0.1×(abs(left nostril width–template left nostril width)+
abs(right nostril width–template right nostril width)))+(0.2×
(abs(right nostril centerline–left nostril centerline–template nostril separation)))+
(0.2×(abs(nostril height–template nostril height)))+(0.5×(abs-
((nostril width/nostril height)–8.0)))+(0.5×(abs(((right nostril
center line–left nostril centerline)/nostril height)–2.0)))

The score representing the differences between the nostril size value of the previous projection threshold value and previous template is retained in memory while a new score is generated for the next template. A comparison is made between the two scores and the memory is updated with the better of the two scores. This process continues until all templates are tested. After finding a best template match to represent the actual nostril size values, the best template values are scaled on the basis of the previous frame nostril separation (i.e. the distance between bumps along the vertical projection threshold) to provide viewing distance normalization which is dependent on the distance of the face from the camera. These adjusted template values represent the nostril size values to be mapped to the synthetic model.

Once the actual nostrils have been properly identified, the NTW is centered around the nostrils by locating the center of each nostril or by using any other centering technique. Then, the angular rotation of the NTW is adjusted so that it corresponds to the actual head tilt in the image plane. Rotational adjustment of the NTW for the first frame is based on the angular deviation of the nostril line from the horizontal plane, or may be determined using any other type of rotation adjustment processing, and the NTW is rotated accordingly about the midpoint of the nostril line. In subsequent frames thereafter, rotational adjustment of the current frame is estimated based on the previous frame compensation. Because the NTW has been oriented (centered and rotated) about the actual nostrils, the position of the NTW is used to define a mouth window in the current image frame, as described below, and as the starting point to track the nostrils in the next image frame. Thus, in accordance with the present invention, the nostrils may be identified and tracked irrespective of noise, illumination variations, head tilt, scale variations and nostril shape.

Mouth Detail Analysis

The next step, which comprises the second part of the nostril tracking and mouth region rotation and scale normalization of block 20, is to locate the mouth region and to adjust for any rotation or scale normalization. Given the position of the actual nostrils determined from the nostril identifying and tracking analysis and the known fixed anatomical relation of the mouth region to the nostrils, a mouth window (MW) is defined in relation thereto. Based on the head rotation previously detected with respect to the nostril tracking window, the mouth tracking window is also adjusted accordingly.

In the preferred embodiment, mouth closure is detected by mouth closure detection and closed mouth line block 25. Each color pixel within the MW is converted to a monochrome image by taking the average of each of the color components, i.e., (R+G+B)/3.

Then, a minimum luminance value is determined as a function of horizontal position within the MW, representing where the lips meet to form a mouth line. Next, the skin color range used in the skin color test is adjusted based on the final color nostril threshold value selected as a result of the nostril area test during the nostril tracking analysis to create a modified skin color range in order to further discriminate between skin color and shadows. The color pixels located between the centers of the nostrils, the three pixels above and below the detected mouth line and the pixel comprising the mouth line (for a total of 7 pixels) are tested against the modified skin color range and those pixels with an intensity falling within the modified skin color range are classified as skin color pixels. If the percentage of skin color pixels surrounding the mouth line is greater than an acceptable mouth line percentage, then the mouth is in a closed position; otherwise, the mouth is in an open position. From testing it has been determined that the preferred value for the acceptable percentage of skin color pixels surrounding a mouth line is 60%; other values may, however, be used. As a result of identifying when the mouth is closed, a closed mouth line is defined by the classified non-skin color pixels. In an alternative embodiment, the closed mouth line may be detected using the isolated frame face analysis of block 10 in lieu of a separate module.

In step 30 an inner lip color threshold array is identified when mouth closure detection module 25 detects that the mouth is closed. While the mouth is closed, the inner lip threshold values are set within a predetermined range of the minimum color intensity values in each column of pixels within the MW. Although it is preferred that the range be set to within 90% to 95% of the minimum color intensity in each column, other ranges may also be used. Thus, the inner lip color threshold array comprises a threshold value associated with each column of pixels within the MW.

At a later time, when the mouth is no longer closed, the inner mouth pixels are identified. In step 40 the corresponding inner lip color threshold value of each column of pixels is applied to the respective pixels within that column of the MW. Pixels within the mouth window with an intensity value below the inner lip color threshold are classified as an inner mouth pixel while those pixels with intensity values greater than the inner lip color threshold are classified as non-inner mouth pixels. Isolated inner mouth pixels are not identified as inner mouth pixels. In order to detect isolated inner mouth pixels, the pixels surrounding each identified inner mouth pixel are examined to determine whether any dark pixels are present. If no dark pixels are present, then the pixel is an isolated inner mouth pixel and is not classified as an inner mouth pixel.

Teeth are detected by color and position in step 50. An inner mouth window is formed around all of the previously identified inner mouth pixels. A teeth search area is defined vertically by the height of the inner mouth window and horizontally between the centers of the nostrils. Two tests are performed on the pixels within the teeth search area. In one test, the intensity of each pixel within the teeth search area is tested to see if it falls within a predetermined RGB teeth color range. Preferably, teeth color minimum and maximum RGB ranges are set to (140, 95, 90) and (220, 200, 200), respectively, although other values may be used. Furthermore, to further ensure accurate detection of the teeth the difference between each of the RGB components of the pixel must not exceed 30. Both tests must be satisfied before a pixel is classified as part of the teeth area and the tests may be performed in any order. Alternatively, YUV values may be used.

Figure 5:
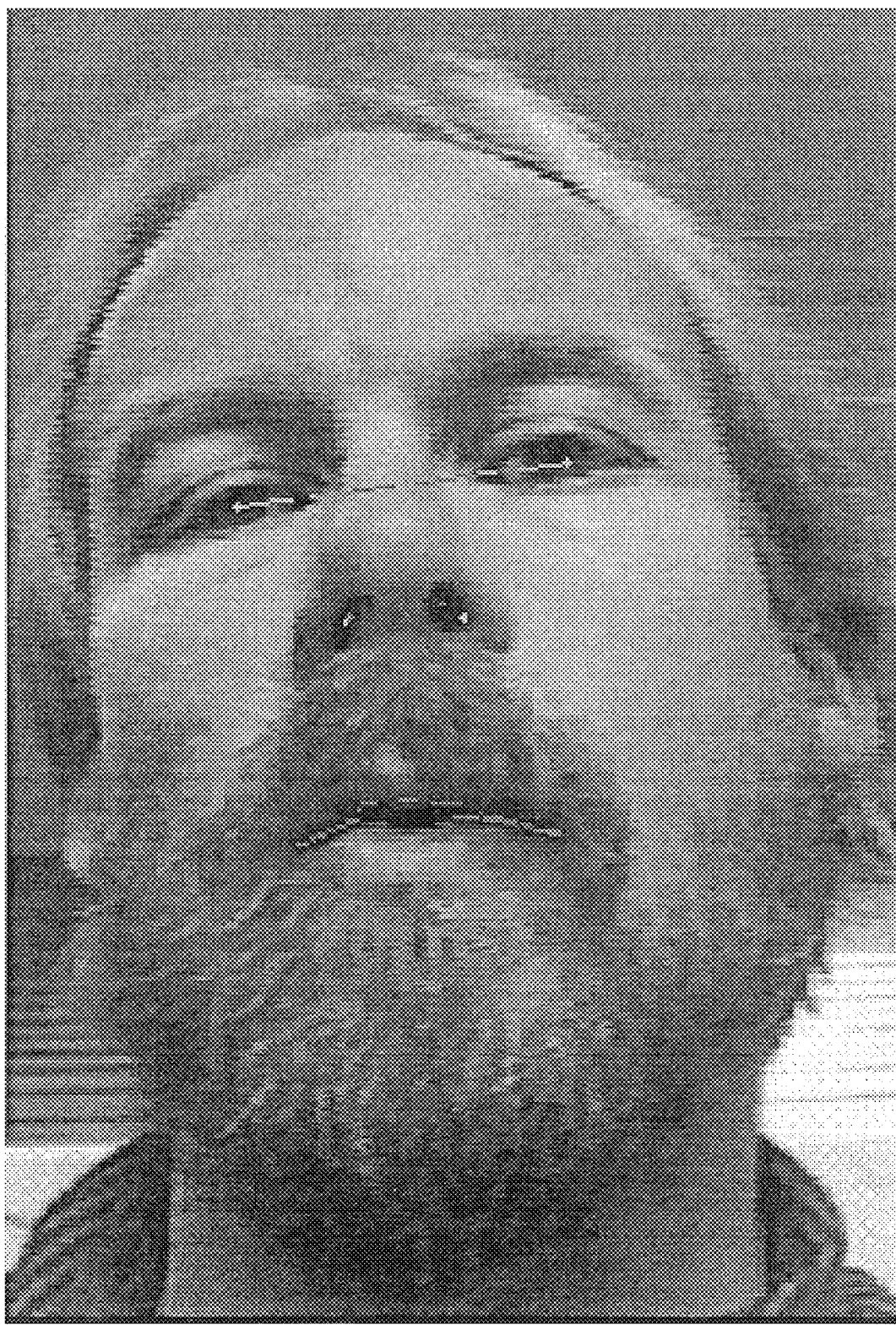
FIG. 5 shows an overlay of the facial feature parameters using the face feature analysis of FIG. 1 on top of the video frame of the corresponding actual face.

The inner lip contour (upper inner lip and lower inner lip contours) of the mouth is identified and defined in step 60. Starting from each mouth corner (as determined from the mouth line detected in block 25), the inner lip contour is generated so that it encloses the identified inner mouth pixels and teeth pixels. In particular, an upper inner lip contour is geometrically represented by a curve starting from each of the mouth corners and having increasing or constant slope approaching the facial centerline so that the contour encompasses all inner mouth and teeth pixels. In a similar manner, the lower inner lip contour is represented by a curve having increasing or constant slope in relation to the upper inner lip contour so that the contour encompasses all inner mouth and teeth pixels. FIG. 5 shows the results of the face feature analysis in which the inner lip contours, center eye positions and actual nostrils are shown overlaid on the video frame of the actual face.

In steps 70 and 80 of FIG. 1, head position information determined by nostril tracking analysis and the inner lip contour information from mouth detail analysis are used to control a synthetic model talking head synchronized with the original human voice. Synthetic head generation processing systems are known and used in text to speech systems as, for example, described in the publications Cohen, Michael M. and Massaro, Dominic W., "Modeling Coarticulation in Synthetic Visual Speech", Models and Techniques in Computer Animation, Springer-Verlag (1993); Parke, F. I., "A Parametric Model for Human Faces", Ph.D. Thesis, University of Utah (1974); Parke, F. I., "A Model for Human Faces that Allows Speech Synchronized Animation", Journal of Computers and Graphics (1975); and, Parke, F. I., "A Parameterized Model for Facial Animation", IEEE Computer Graphics and Applications (1982), all of which are incorporated herein by reference. The head position of the synthetic model head is based on the nostril positions and controls the horizontal and vertical synthetic model position relative to the camera model in the graphics rendering system. Adjustments for head tilt are made, for example, based upon the angle between the line connecting the eye line (the line connecting the center of mass of each eye) or nostril line (the line connecting the center of mass of each nostril) and a horizontal plane. Preferably the eye line is used to detect head tilt since it is subject to less noise. In order to increase smoothness, it is also preferred that the final head tilt angle be averaged over more than one frame.

Figure 6:
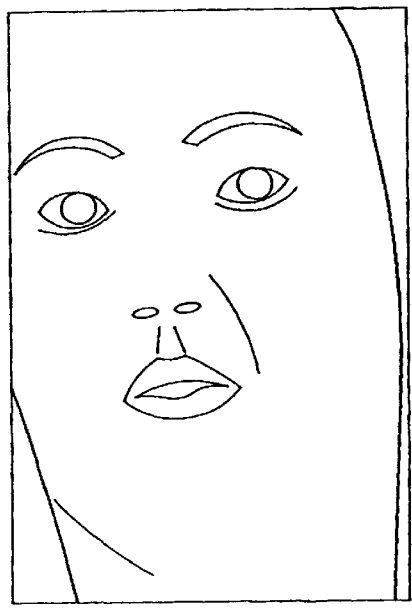
FIG. 6 shows a synthetic model face generated in accordance with the facial parameters of FIG. 5.

The inner lip contour is directly compared to the inner lip contour of the synthetic model head. It is advantageous to color the lips a unique color to sharpen the vertical transitions between the lips and mouth opening of the synthetic model head. The teeth pixels are removed before beginning the analysis. A purely geometric computation may be used to generate the inner lip contour of the synthetic model. It is preferred, however, to use a more expedient approach to generating the synthetic inner lip contour by finding, a distance measure, i.e. the difference between the vertical distance between the actual inner lip contours and the vertical distance between the inner lip contours of the rendered synthetic model. An additional weighting factor may be applied if the real inner lip contour lies outside of the inner lip contour of the synthetic model since the actual inner lip contour tends to err on the smaller side because of concavities. Based on the distance measure results, synthetic model mouth parameters (e.g. the upper and lower inner lip position, mouth corner position and mouth scale) are adjusted in combination for each frame until the best match to the actual mouth is achieved. For greater computational efficiency, synthetic model mouth parameters from the previous frame are used to constrain the search for the optimal parameter values in the current frame. Since jaw rotation is not directly determined from the actual face, it is estimated as a small fraction of the vertical mouth opening (i.e. the vertical distance between the upper and lower inner lip contours). FIG. 6 shows the synthetic model head generated using the head tilt and inner lip contours from FIG. 5.

The mapping process described in the previous section is highly accurate but relatively slow. A more efficient method for mapping the inner lip contour to the face model parameters uses the mapping process described above to create or produce vector quantizations of a model parameter space. First, a set of samples of every mouth position is selected. One or more speakers are then recorded on video for each sample, and the mapping process described above is performed on the video data representing each sample. A codebook of model mouth parameter combinations is developed by clustering the processed video data using known vector quantization clustering algorithms, as, for example, described in Netraveli and Haskell, Digital Pictures, Pleanum (1988), which is incorporated herein by reference. The entire parameter space can be adequately represented by a few thousand codebook vectors. Finally, the codebook can be applied directly to a new face video input signal by directly computing the distances between the actual upper and lower inner lip contours and the synthetic model upper and lower inner lip contours stored within each codebook vector. Moreover, encoding the mouth parameters in such fashion improves transmission efficiency since 2048 vectors can be encoded using 11 bits per frame.

Thus, while there have shown and described and pointed out fundamental novel features of the invention as applied to preferred embodiments thereof, it will be understood that various omissions and substitutions and changes in the form and details of the disclosed methods may be made by those skilled in the art without departing from the spirit of the invention. For example, it is expressly intended that all combinations of those method steps which perform substantially the same function in substantially the same way to achieve the same results are within the scope of the invention. Substitutions of method steps and details thereof from one described embodiment to another are also fully intended and contemplated. It is the intention, therefore, to be limited only as indicated by the scope of the claims appended hereto.

We claim:

1. A face feature analysis method for distinguishing features of a face of a subject in variable lighting conditions, comprising the steps of:

a) generating a plurality of eye, nose and mouth candidates within a current image frame which includes the face of the subject;

b) defining a nostril tracking window within the current image frame around one of the nose candidates, wherein said nostril tracking window is defined so as to exclude the eye and mouth candidates and to assure inclusion of nose nostrils of the subject in a next frame after a fastest possible head movement between said current and next frames; and c) analyzing each pixel within said nostril tracking window to determine whether the nose candidate enclosed within said nostril tracking window represents actual nostrils by performing a skin color area test and a nostril area test.

2. The method of claim 1, wherein said skin color area test includes the steps of:

(d) comparing an intensity of each pixel within said nostril tracking window to a range of pixel intensities corresponding to a range of possible skin colors of the face of the subject and classifying the pixel as a skin color area pixel if the intensity is within the range of possible skin colors;

(e) identifying a percentage area of skin color area pixels within the nostril tracking window; and (f) comparing said percentage area of skin color area pixels to an acceptable range of percentage area of skin color area pixels, wherein if said percentage area of skin color area pixels is within the acceptable range of percentage area of skin color area pixels then actual nostrils have been detected within said nostril tracking window, and if said percentage area of skin color area pixels is outside the acceptable range of percentage area of skin color area pixels then the actual nostrils are not enclosed within said nostril tracking window and said step c) is repeated to define a nostril tracking window around another nose candidate and steps d) through f) are repeated after said repeated step c).

3. The method of claim 1, wherein the nostril area test includes the steps of:

d) binarizing each pixel within said nostril tracking window by comparing the intensity of each pixel within said nostril tracking window to one color nostril threshold in a range of color nostril thresholds and classifying the pixel as a nostril pixel if the intensity is greater than the color nostril threshold;

e) identifying an area percentage of nostril pixels within said nostril tracking window;

f) comparing said area percentage of nostril pixels to an acceptable range of area percentage of nostril pixels, wherein if said area percentage of nostril pixels is outside the acceptable range of area percentage of nostril pixels then the color nostril threshold is adjusted, and if the adjusted color nostril threshold value is within the range of color nostril threshold values then steps d) through f) are repeated, and if the adjusted nostril threshold value is outside the range of nostril threshold values then the actual nostrils have not been located within said nostril tracking window and said nostril tracking window is defined around another nose candidate; and wherein, if said area percentage of nostril pixels is within the acceptable range of area percentage of nostril pixels then the actual nostrils are verified as being enclosed within said nostril tracking window and said nostril threshold value represents a final selected nostril threshold value.

4. A face feature analysis method for distinguishing features of a face of a subject in variable lighting conditions, comprising the steps of:

a) generating a plurality of eye, nose and mouth candidates within a current image frame which includes the face of the subject;

b) defining a nostril tracking window within the current image frame around one of the nose candidates, wherein said nostril tracking window is defined so as to exclude the eye and mouth candidates and to assure inclusion of nose nostrils of the subject in a next frame after a fastest possible head movement between said current and next frames; and c) analyzing each pixel within said nostril tracking window to determine whether the nose candidate enclosed within said nostril tracking window represents actual nostrils by:

d) comparing an intensity of each pixel within said nostril tracking window to a range of pixel intensities corresponding to a range of possible skin colors of the face of the subject and classifying the pixel as a skin color area pixel if the intensity is within the range of possible skin colors;

e) identifying a percentage area of skin color area pixels within the nostril tracking window;

f) comparing said percentage area of skin color area pixels to an acceptable range of percentage area of skin color area pixels, wherein if said percentage area of skin color area pixels is within the acceptable range of percentage area of skin color area pixels then actual nostrils have been detected within said nostril tracking window, and if said percentage area of skin color area pixels is outside the acceptable range of percentage area of skin color area pixels then the actual nostrils are not enclosed within said nostril tracking window and said step c) is repeated to define a nostril tracking window around another nose candidate and steps d) through f) are repeated after said repeated step c).

5. The face feature analysis in claim 4, wherein step c) further comprises the step of verifying that the actual nostrils have been detected within said nostril tracking window, said verification step further comprising the steps of;

g) binarizing each pixel within said nostril tracking window by comparing the intensity of each pixel within said nostril tracking window to one color nostril threshold in a range of color nostril thresholds and classifying the pixel as a nostril pixel if the intensity is greater than the color nostril threshold;

h) identifying an area percentage of nostril pixels within said nostril tracking window;

i) comparing said area percentage of nostril pixels to an acceptable range of area percentage of nostril pixels, wherein if said area percentage of nostril pixels is outside the acceptable range of area percentage of nostril pixels, then the color nostril threshold is adjusted and if the adjusted color nostril threshold value is within the range of color nostril threshold values then steps g) through i) are repeated whereas, if the adjusted nostril threshold value is outside the range of nostril threshold values then the actual nostrils have not been located within said nostril tracking window and said nostril tracking window is defined around another nose candidate; and wherein, if said area percentage of nostril pixels is within the acceptable range of area percentage of nostril pixels then the actual nostrils are verified as being enclosed within said nostril tracking window and said nostril threshold value represents a final selected nostril threshold value.

6. The face feature analysis method in claim 5, further comprising the step of determining nostril values of the actual nostrils enclosed within said nostril tracking window and matching said nostril values to a template, said step of determining said nostril values comprising the steps of:

j) projecting in a horizontal and in a vertical direction each pixel within said nostril tracking window for each horizontal and vertical projection threshold in a range of horizontal and vertical projection thresholds to generate at least one horizontal projection run and one vertical projection run;

k) generating said nostril size values for each horizontal and vertical projection threshold from a run length of projection values which exceed said vertical and horizontal projection thresholds;

l) comparing said nostril size values for each horizontal and vertical projection threshold in the range of horizontal and vertical projection thresholds to nostril size values of each template in a set of possible template values to find a best match template; and m) scaling the best match template based on nostril separation of a previous frame.

7. The face feature analysis method in claim 6, wherein said step l) further comprises the steps of:

n) assigning a score to each comparison of said nostril size values for each horizontal and vertical projection threshold to the nostril size values for each template, wherein said score is defined as score=(0.1×(abs(left nostril width−template left nostril width)+ abs(right nostril width−template right nostril width)))+(0.2× (abs(right nostril centerline−left nostril centerline−template nostril separation)))+(0.2×(abs(nostril height− template nostril height)))+(0.5×(abs((nostril width/nostril height)−8.0)))+(0.5×(abs(((right nostril center line−left nostril centerline)/nostril height)−2.0)));

o) storing in a memory a current score based on one template;

p) comparing the current score with another next score generated using another template and updating said memory with a better score of the current and next scores, and repeating steps n) through p) for each horizontal and vertical projection threshold in the range of horizontal and vertical projection thresholds and for each template value within the range of template values.

8. The face feature analysis method in claim 6, further comprising the step of orienting said nostril tracking window about the actual nostrils detected therein, said orienting step comprising the steps of:

q) centering said nostril tracking window about the actual nostrils; and r) rotating said nostril tracking window relative to the actual nostrils to compensate for head tilt of the subject.

9. The face feature analysis method in claim 8, further comprising the step of generating a closed mouth line, said generating step comprising the steps of:

s) defining a mouth window in the image frame relative to said centered and rotated nostril tracking window;

t) converting each color pixel within said mouth window to a monochrome pixel by averaging R, G and B color components of each pixel;

u) finding a minimum luminance as a function of horizontal position for each column of pixels within said mouth window to locate a mouth line;

v) generating a modified skin color range by adjusting the skin color range based on the final selected nostril threshold value to further distinguish skin color from shadows;

w) defining a closed mouth window within said mouth window to include pixels bounded vertically between centers of each of the actual nostrils and bounded horizontally in a range seven pixels wide, said range representing three pixels above and three pixels below the mouth line and including the mouth line;

x) comparing an intensity of each pixel within said closed mouth window to said modified skin color range and classifying the pixel as a modified skin color pixel if the intensity is within said modified skin color range;

y) finding an area percentage of modified skin color pixels within said closed mouth window;

z) comparing said area percentage of modified skin color pixels to an acceptable range of area percentage of modified skin color pixels and, if said area percentage of modified skin color pixels is within the acceptable range of area percentage of modified skin color pixels, then a closed mouth position has been detected; and aa) defining a closed mouth line based on the pixels in said closed mouth window which are non-modified skin color area pixels.

10. The face feature analysis method in claim 9, further comprising the step of identifying inner mouth pixels within said mouth window, said mouth pixels identifying step comprising the steps of:

bb) setting an inner lip color threshold array to a range of minimum color intensity values as a function of horizontal position for each column within said mouth window;

cc) comparing for each said column an intensity of each pixel within said mouth window to the respective inner lip color threshold for the said each column of pixels and classifying as an inner mouth pixel if the intensity is less than said inner lip color threshold; and dd) analyzing each inner mouth pixel within said mouth window to determine if the inner mouth pixel is an isolated inner mouth pixel and ignoring isolated inner mouth pixels so that only the inner mouth pixels are detected.

11. The face feature analysis method in claim 10, further comprising the step of identifying teeth pixels within said mouth window, said teeth pixels identifying step comprising the steps of:

ee) defining an inner mouth window within the image frame and enclosing said inner mouth pixels;

ff) defining a teeth search window within said inner mouth window, said teeth search window corresponding in height to the height of said inner mouth window and bounded horizontally between centers of the actual nostrils; and gg) analyzing each pixel within said inner mouth window to determine whether it is a teeth pixel, said analyzing step comprising the step of comparing an intensity of each pixel within said teeth search window to pixel intensities corresponding to a teeth color range and calculating a difference between each R, G and B color component for each pixel within said teeth search window, wherein said each pixel is classified as a teeth pixel if the intensity is within the teeth color range and the difference between each color component is less than or equal to 30.

12. The face feature analysis method in claim 11, further comprising the step of generating an inner lip contour, said inner lip contour generating step comprising the step of:

hh) generating an upper inner lip contour geometrically represented by curves beginning at each mouth corner and having at any given moment one of increasing and constant slope towards a facial centerline so that said upper inner lip contour encloses said inner mouth and teeth pixels; and ii) generating a lower inner lip contour geometrically represented by a curve having at any given moment one of increasing and constant slope relative to the curves representing said upper inner lip contour so that said lower inner lip contour encloses said inner mouth and teeth pixels.

13. The face feature analysis method in claim 12, further comprising the step of mapping the inner lip contour to a generated synthetic head and adjusting the synthetic head to correspond to the inner lip contour, said step of mapping comprising the steps of:

jj) generating a synthetic model head based on said nostril size values and said inner lip contour;

kk) directing comparing said inner lip contour with an inner lip contour of said synthetic model head by finding a distance measure representing a difference between a first vertical distance between said upper and lower inner lip contours and a second vertical distance between said upper and lower inner lip contours of said synthetic model head; and ll) adjusting the inner lip contour of said synthetic model head and repeating step jj) until a best match is achieved.

14. The face feature analysis method in claim 13, wherein said steps kk) and ll) are performed once for a set of samples of every mouth position to generate a plurality of codebook vectors of synthetic model mouth parameters using a vector quantization clustering algorithm and then directly comparing the upper and lower inner lip contours with synthetic upper and lower inner lip contours stored within each codebook vector.

15. The face feature analysis method in claim 6, further comprising the steps, when two vertical and horizontal projection runs are generated, of:

mm) defining a horizontal line bisecting each horizontal projection run and a vertical line bisecting each vertical projection run to thereby generate a four intersections within said nostril tracking window, wherein each of the four intersections represents a possible location of one of the actual nostrils;

nn) binarizing pixels surrounding each of the four intersections based on said final selected nostril threshold value and classifying the pixels as nostril pixels if the pixel has an intensity greater than said final selected nostril threshold value; and oo) classifying two of the four intersections as representing the actual nostrils in which the nostril pixels are detected, wherein the two intersections in which the actual nostrils are detected are diagonally opposed to one another.

16. A face feature analysis method for distinguishing features of a face of a subject in variable lighting conditions, comprising the steps of:

a) generating an actual inner lip contour including an actual upper and an actual lower inner lip contour;

b) generating a synthetic inner lip contour including a synthetic upper and a synthetic lower inner lip contour based on said actual upper and lower inner lip contours;

c) directly comparing said actual inner lip contour with said synthetic inner lip contour by determining a distance measure representing a difference between a vertical distance between said actual upper and lower inner lip contours and a vertical distance between said synthetic upper and lower inner lip contour; and d) adjusting said synthetic inner lip contour and repeating step c) until a best match is achieved.

17. The method for face feature analysis in claim 16, wherein step c) is performed once for a set of samples of every mouth position to generate a plurality of codebook vectors of synthetic model mouth parameters using a vector quantization clustering algorithm and then directly comparing said upper and lower inner lip contours to the synthetic model mouth parameters stored within each codebook vector.

* * * * *